O. JOHNSON.
METHOD OF AND MEANS FOR MAINTAINING SHIPS AFLOAT.
APPLICATION FILED JAN. 21, 1918.
1,303,910.
Patented May 20, 1919.
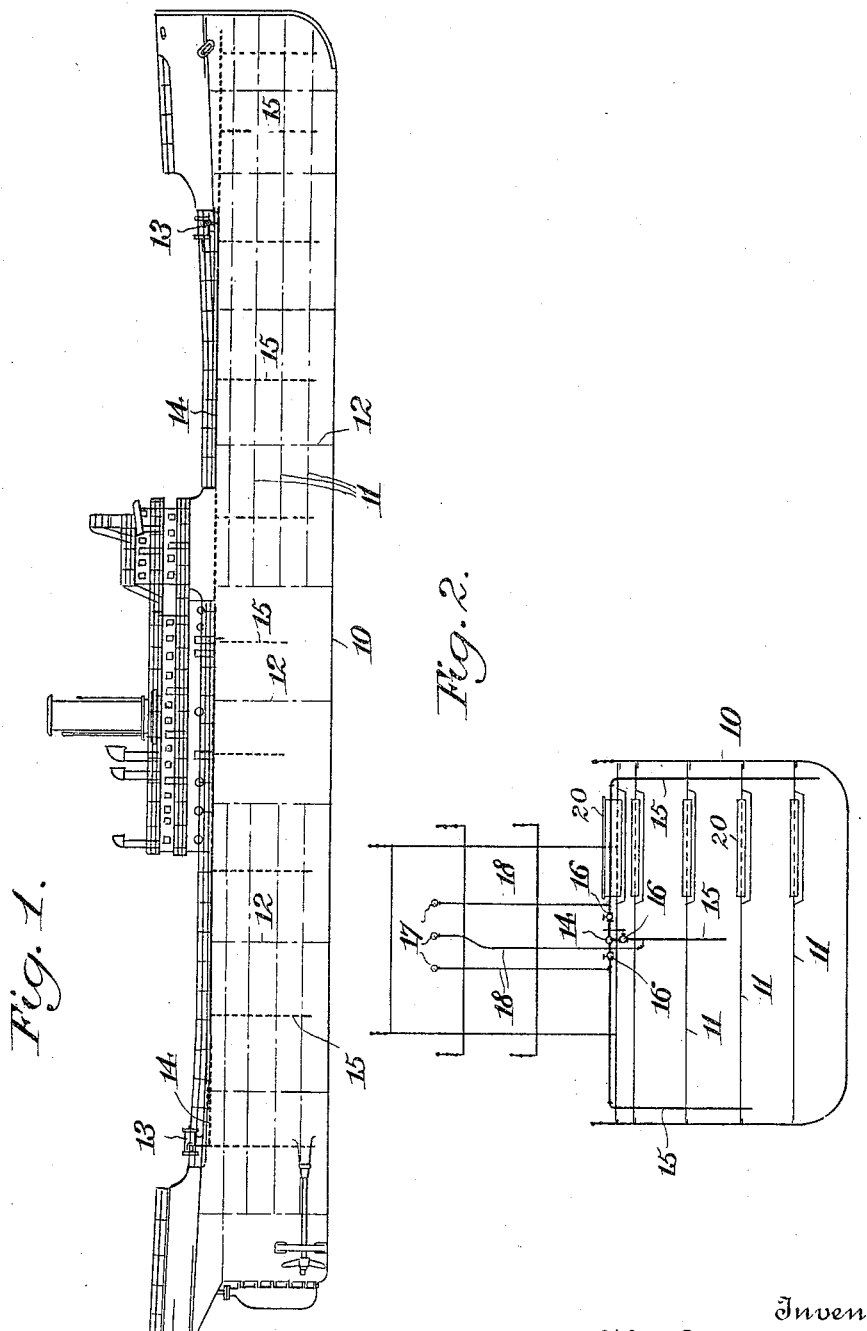
Inventor,
Olaf Johnson.
By his Attorneys,
Meyers, Cushman & Rea.

UNITED STATES PATENT OFFICE.

OLAF JOHNSON, OF WEST NEW YORK, NEW JERSEY, ASSIGNOR OF ONE-HALF TO BERTINENS KLAVENES, OF BROOKLYN, NEW YORK.

METHOD OF AND MEANS FOR MAINTAINING SHIPS AFLOAT.

1,303,910.

Specification of Letters Patent.  Patented May 20, 1919.

Application filed January 21, 1918.  Serial No. 212,912.

*To all whom it may concern:*

Be it known that I, OLAF JOHNSON, a subject of the King of Norway, residing at West New York, in the county of Hudson and State of New Jersey, have invented new and useful Improvements in Methods of and Means for Maintaining Ships Afloat, of which the following is a specification.

This invention relates to methods of and means for maintaining vessels afloat.

The present invention is designed more particularly for the purpose of reducing the liability of vessels, damaged under warfare conditions or through accident, from sinking, and more particularly for the purpose of retaining them afloat at least for a length of time sufficient to permit temporary repairs being made to enable the vessel to reach port or to remain afloat a sufficient length of time to permit rescue of human life.

Various attempts had been made to minimize the effects on vessels brought about by warfare conditions, but these attempts have been more or less unsuccessful, especially where the vessels have been actually attacked and torpedoed. Protective devices for the purpose of preventing explosions from being effective on the vessel have been devised, but the present invention does not contemplate actual protection by preventing explosion, but rather to take care—at least temporarily—of conditions which may be brought about by the explosive effects, this result being provided without affecting the ability to operate the vessel at maximum speed under usual conditions.

This result is obtained by preventing, as far as possible, the inrush of water through the openings in the vessel produced by the explosion or accident, this effect being produced by the presence of a counter-pressure within the vessel which opposes the water pressure. This counter-pressure, especially under warfare conditions, is provided in anticipation of possible damage to the sides of the vessel, so that in the event of an explosion taking place, the counter-pressure is available to restrict water ingress, this counter-pressure being increased to a desired degree in substantially immediate succession to the damage to the sides of the vessel, the result being that the amount of water which may enter may be restricted to an extent sufficient to maintain the vessel afloat for a length of time sufficient to provide temporary repairs or to decrease the liability of loss of human life.

In the embodiment of the present invention disclosed herein, this counter-pressure is provided by compressed air within the body of the vessel, the pressure being maintained to a desired degree, the general arrangement preferably being such that all or a predetermined number of the under-water compartment structures be maintained independent as far as possible so as to permit each compartment to form a counter-pressure chamber substantially individual to itself, each chamber being connected to a suitable source of compressed air supply so as to maintain a desired pressure within the compartment. This permits utilization of the general arrangement as a tell-tale for indicating the particular portion or portions of the vessel which may have become damaged, material reduction of pressure in any compartment being indicated and thus enabling the compressed air supply to be quickly brought into operation in connection with the compartment or compartments which have been affected, enabling localized concentration of supply at the particular points which are in danger.

The general arrangement is such as to permit of its application to vessels in service and is sufficiently flexible in character so as not to be restricted to a particular type of vessel, the structures employed being such as to permit installation and operation with a minimum of expense.

To these and other ends, the nature of which will be readily understood as the invention is hereinafter more fully disclosed, said invention consists in the improved methods and construction and combination of parts hereinafter more fully described, illustrated in the accompanying drawings and more particularly pointed out in the appended claims.

In the accompanying drawings, in which similar reference characters indicate similar parts in each of the views, Figure 1 is a view in side elevation, more or less diagrammatic in character, of a vessel to which the present invention has been applied.

Fig. 2 is a diagrammatic view taken transversely of the length of the vessel.

The vessels, especially of the cargo-carrying type, are generally provided with holds or compartments which are located in the hull and generally below the water-line, these holds or decks being generally provided with bulk-heads, etc., thereby forming a plurality of compartments in each hold or deck, the bulkheads being generally arranged in such manner as to provide for water-tight segregation of one compartment with another. As a result, each compartment is more or less air-tight—it can be readily made so if necessary—and hence can be made to form an efficient counter-pressure chamber within the hull below the water-line. The main purpose of the invention is to provide a counter-pressure action which is immediately effective in the presence of damage, and to be able to rapidly increase the degree of counter-pressure when such action is essential. Inasmuch as these compartments generally contain more or less cargo, the amount of air required to produce the desired pressure in any compartment is necessarily less than where the compartment is empty, and this aids in the general action through the fact that the supply of a definite quantity of air will increase the pressure more rapidly where cargo is present, and thus increase the rapidity with which the maximum counter-pressure desired is provided.

Various ways of accomplishing these results may be provided, the drawings indicating, in conventional form, a general arrangement affording flexibility to accommodate for vessels of various types.

In the drawings, the hull of the vessel is indicated at 10, and having a number of holds and decks 11, divided by suitable bulkheads 12, thus forming compartments which are more or less inividual and are designed to be made substantially air-tight, especially when the vessel is approaching a point where danger may threaten.

The vessel carries one or more—the drawings show two—air compressing units 13 of any suitable type, the unit or units being connected to a main pipe line or conduit 14, these parts being preferably arranged at a point above the water-line, the units obviously having suitable means for operating the compressors, such as motors or other types of drive mechanism.

15—15 designate branch lines which tap the main line 14 at proper points, each branch line being preferably designed to enter an individual compartment. A simple arrangement is shown in Fig. 2 in which three holds are being protected in this manner, three branch lines 15 extending from the main line 14, these lines having their outlets in the several compartments. Where the bulkhead arrangement provides for transverse arrangement of bulkheads throughout the width of the vessel, each vertical series of compartments will have its series of branch lines, these series being indicated by the dotted lines 15 in Fig. 1. While these branch lines are shown as having the discharges spaced at different points in the width of the vessel, it is obvious that this is variable to any desired extent.

As shown, each branch line is preferably provided with a valve 16, although this is not absolutely essential. These valves are adapted to control the delivery of compressed air from the main line 14 to the compartment which is being protected, and where these valves are employed, they may be closed after the desired normal counter-pressure has been built up within a compartment, the valve being opened when it is found necessary to rapidly increase the counter-pressure, the individual valve control enabling the entire compressor action to be placed on an individual compartment or compartments, as may be found necessary.

While these valves may be dispensed with, and thus provide for a more or less automatic action, or a similar result be obtained by leaving the valves open, it is preferred that the valves be closed after the normal counter-pressure has been built up, and only the valves controlling the affected compartments to be opened. This arrangement is preferred to the complete automatic action for the reason that the invention contemplates producing an abnormal counter-pressure within particular compartments, and by opening up only those branch lines which are necessary, the compressor action is localized and not distributed—providing more efficient action—and at the same time preventing any undue counter-pressure in the unaffected compartments.

In addition, the invention contemplates a tell-tale action by means of which the particular points of danger can be quickly ascertained and the protective measures placed in operation rapidly. This result is obtained by the use of means for indicating the pressure within each compartment. This means may be in the form of pressure gages 17—preferably one for each branch line—these gages being connected to the branch lines by suitable connections 18 which tap the branch lines preferably on the side which is in open communication with the compartment. These gages may, if desired, be led to a central point, where the entire system may be under the inspection of a watchman who, through the variations which are indicated on particular gages when danger is present, will be able to issue immediate orders relative to the compressor mechanisms and individual branch lines.

Obviously, where each compartment has been provided with the desired counter-pressure—variable as to amount of compressed air introduced in accordance with the free space within the compartment—the several gages will indicate the presence of this pressure—the indications remaining substantially constant while no danger is present, such changes as may occur being due to leakage. Where, however, the walls of a compartment have become damaged by the explosive action of a torpedo or mine, the pressure within the compartment will be quickly varied, through either the escape of air from the compartment—reducing the pressure therein—or by rapid increase in pressure through the action of the water pressure from without the vessel. In either instance, there is a variation in the state of the gage of the compartment, and the indication provided thereby will enable the watchman to immediately locate the point of difficulty so that the activities leading to the rapid building up or increase of counter-pressure can be started at once and applied directly to the point of danger. Where the damage is small and the variation in pressure indicated is slight, the vessel is obviously in no immediate danger and where the variation is large, it will not only be readily and quickly seen, but it will also indicate to some extent the character and possible extent of the damage and where this indication is shown in connection with more than one compartment, the critical nature of the situation will be quickly seen and the necessary protective measures taken. In this latter connection, the use of more than a single compressor unit may be advantageous, since a comparatively small amount of damage can be overcome by the operation of a single compressor unit whereas an extended damage covering several compartments will enable the full effect of all of the units to be concentrated on the particular danger area.

It is not essential that the normal counter-pressure be maintained within the compartments where there is no liability of danger. Under warfare conditions of the present day, counter-pressure could be placed within the compartments as the vessel is approaching the danger zone, thus preparing the vessel for possible action. If no danger threatens while passing the danger zone, the normal counter-pressure remains substantially constant, and at the end of the voyage may be relieved in any desired manner, as for instance by opening the compartment. When, however, damage is present and danger threatens, it is not only indicated but the danger point is localized and means are provided for centralizing the entire action on this danger point.

Since all of the apparatus is contained within the vessel itself, there is no retarding action placed on the speed of the vessel, and therefore, the latter is free to have its normal movement.

While I have herein shown and described a preferred way in which the invention may be carried out, it will be understood that changes and modifications therein may be required or desired to meet individual conditions of installation and of use, and I therefore desire to be understood as reserving the right to make any and all such changes or modifications, either as to method or apparatus, as may be found essential or desirable, in so far as the same may fall within the spirit and scope of the invention as expressed in the claims.

It will be understood, of course, that the openings leading into the compartments—generally in the form of hatches, indicated conventionally at 20, will be arranged so as to provide a practically air-tight closure of these openings, thereby providing for the substantially air-tight condition of the compartment desired for the counter-pressure operation. Obviously, the covers employed would be so arranged as to maintain this condition against the pressure within the compartment, and may obviously employ the usual gasket feature for the purpose of aiding in the formation of this condition.

What I claim is:

1. The method of maintaining ships afloat, which consists in establishing a normal pressure of predetermined value and greater than atmospheric pressure in each of a predetermined number of interior compartments of the vessel and maintaining such pressure therein in the absence of damage to the walls thereof to produce individual counter-pressure chambers, and rapidly increasing the value of such counter-pressure in succession to the damaging of walls of individual chambers.

2. As a means for maintaining compartment-containing ships afloat, a fluid-pressure supply unit, means for operatively connecting predetermined compartments to said unit to establish a normal fluid pressure therein of predetermined value and greater than atmospheric pressure to constitute each such compartment as a counter-pressure chamber, indicating means responsive to pressure variations in such chambers, and means for controlling the communication between the unit and each chamber, whereby unit action may be made effective in one or more chambers to rapidly increase the value of the counter-pressure therein.

3. As a means for maintaining compartment-containing ships afloat, a fluid pressure supply unit, a main distributing line, branch distribution lines connecting predetermined compartments with the main line, whereby said unit may establish a normal fluid pressure of predetermined value and greater than atmospheric pressure in each of such compartments to constitute such compartments as individual counter-pressure chambers, pressure indicating means for and connected to individual branch lines and in open communication with the chambers having such lines to cause said indicating means to be responsive to pressure variations in the individual chambers, and valves controlling said branch lines, whereby the supply unit operation may be made effective in one or more chambers to rapidly increase the value of the counter-pressure therein.

OLAF JOHNSON.

Copies of this patent may be obtained for five cents each, by addressing the "Commissioner of Patents, Washington, D. C."